United States Patent
Go

(10) Patent No.: US 8,069,488 B2
(45) Date of Patent: Nov. 29, 2011

(54) METHOD AND APPARATUS FOR EXCLUSIVELY CONTROLLING A DEVICE IN A HOME NETWORK

(75) Inventor: Gwang-ok Go, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1125 days.

(21) Appl. No.: 11/583,090

(22) Filed: Oct. 19, 2006

(65) Prior Publication Data
US 2008/0229406 A1   Sep. 18, 2008

(30) Foreign Application Priority Data
Oct. 19, 2005   (KR) .................... 10-2005-00098729

(51) Int. Cl.
*G06F 7/04* (2006.01)
(52) U.S. Cl. ...................................... 726/29
(58) Field of Classification Search ............ 726/29
See application file for complete search history.

(56) References Cited

U.S. PATENT DOCUMENTS

| | | | | |
|---|---|---|---|---|
| 6,654,821 B1 * | 11/2003 | Aikawa et al. | ................... | 710/36 |
| 7,299,304 B2 * | 11/2007 | Saint-Hilaire et al. | .......... | 710/11 |
| 7,594,022 B2 * | 9/2009 | Warren et al. | ................. | 709/229 |
| 7,610,616 B2 * | 10/2009 | Masuoka et al. | ................ | 726/5 |
| 2003/0018682 A1 * | 1/2003 | Katayama | ..................... | 709/102 |
| 2003/0093670 A1 * | 5/2003 | Matsubayashi et al. | ...... | 713/168 |
| 2003/0114107 A1 * | 6/2003 | Aoyagi | ........................... | 455/41 |
| 2003/0177270 A1 | 9/2003 | Noda et al. | | |
| 2004/0150530 A1 * | 8/2004 | Haruki | ..................... | 340/825.72 |
| 2005/0021785 A1 | 1/2005 | Nakaji | | |
| 2007/0039039 A1 * | 2/2007 | Gilbert et al. | ..................... | 726/4 |

FOREIGN PATENT DOCUMENTS

| | | |
|---|---|---|
| EP | 1691525 A1 | 8/2006 |
| JP | 2002-084582 A | 3/2002 |
| JP | 2003-116181 A | 4/2003 |
| JP | 2004-252974 A | 9/2004 |
| KR | 10-2004-0055446 A | 6/2004 |
| KR | 10-2004-0055456 A | 6/2004 |
| WO | 2005046166 A1 | 5/2005 |

OTHER PUBLICATIONS

Ellison c., "UPnPTM Security Ceremonies Design Document for UPnPTM Device Architecture 1.0," XP002355814, Oct. 3, 2003, http://www.upnp.org/download/standardizeddcps/ UPnSecurityCeremonies_1_0secure.pdf.
Communication dated Jul. 26, 2011, issued by the Japanese Patent Office in Japanese Application No. 2006-284261.

* cited by examiner

*Primary Examiner* — Jeffrey D Popham
(74) *Attorney, Agent, or Firm* — Sughrue Mion, PLLC

(57) ABSTRACT

A method and apparatus exclusively control a device in a home network. A control point requests exclusive control authority from the device. In response to the request the control point receives an identifier (RID) used to successfully authenticate the exclusive control authority. The control point then acquires the exclusive control authority and controls the device. Accordingly, it is possible to prevent other control points from interfering with the device so as not to perform an operation which is not desirable for the control point that acquires the exclusive control authority over the device.

24 Claims, 6 Drawing Sheets

| DEVICE NAME | CONTROLLED (o or x) | CONTROL POINT NAME |
|---|---|---|
| UPnP DEVICE1(MediaRenderer) | 0 | CP1 |
| UPnP DEVICE2(MediaRenderer) | 0 | CP1 |
| UPnP DEVICE3 | 0 | CP1 |
| UPnP DEVICE4 | 0 | CP1 |

FIG. 5

```
NOTIFY * HTTP/1.1
HOST: 239.255.255.250:1900
CACHE-CONTROL: max-age = seconds until advertisement expires
LOCATION: URL for UPnP description for root device
NT: search target
NTS: ssdp:alive
SERVER: OS/version UPnP/1.0 product/version
USN: advertisement UUID
CONTROL-STATUS: NOT-MONOPOLY
```

FIG. 6

```
NOTIFY * HTTP/1.1
HOST: 239.255.255.250:1900
CACHE-CONTROL: max-age = seconds until advertisement expires
LOCATION: URL for UPnP description for root device
NT: search target
NTS: ssdp:alive
SERVER: OS/version UPnP/1.0 product/version
USN: advertisement UUID
CONTROL-STATUS: MONOPOLY/Control Point 1
MONOPOLY-TIME: Second-500
```

FIG. 7A

```
RESERVE * HTTP/1.1
HOST: hostname:portnumber
VISION: NOT-VISIBLE
TIMEOUT: Second-requested reservation time
```

FIG. 7B

```
HTTP/1.1 200 OK
VISION: VISIBLE
RID: uuid:reservation-UUID
TIMEOUT: Second-actual reservation time
```

FIG. 8

```
RESERVE * HTTP/1.1
HOST: hostname:portnumber
RID: uuid:reservation-UUID
TIMEOUT: Second-requested reservation time
```

FIG. 9A

```
UNRESERVE * HTTP/1.1
HOST: hostname:portnumber
RID: uuid:reservation-UUID
```

FIG. 9B

```
HTTP/1.1 200 OK
```

FIG. 10

```
POST path of control URL HTTP/1.1
HOST: host of control URL:port of control URL
CONTENT-LENGTH: bytes in body
CONTENT-TYPE: text/xml; charset="utf-8"
SOAPACTION: "urn:schemas-upnp-org:service:serviceType:v#actionName"
RID: uuid:reservation-UUID <?xml version="1.0"?>
<s:Envelope
    xmlns:s="http://schemas.xmlsoap.org/soap/envelope/"
    s:encodingStyle="http://schemas.xmlsoap.org/soap/encoding/">
  <s:Body>
    <u:actionName xmlns:u="urn:schemas-upnp-org:service:serviceType:v">
      <argumentName>in arg value</argumentName>
      other in args and their values go here, if any
    </u:actionName>
  </s:Body>
</s:Envelope>
```

METHOD AND APPARATUS FOR EXCLUSIVELY CONTROLLING A DEVICE IN A HOME NETWORK

CROSS-REFERENCE TO RELATED PATENT APPLICATION

This application claims the benefit of Korean Patent Application No. 10-2005-00098729, filed on Oct. 19, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to home device control in a home network, and more particularly, to methods and apparatuses and articles of manufacture for exclusively controlling a controlled device in a universal plug and play (UPnP) network.

2. Description of Related Art

A universal plug and play (UPnP) network includes a controlled device, that is, a home device which is connected to an Internet Protocol (IP) based home network and a control point which controls the controlled device.

FIG. 1 is a view showing the construction of a general UPnP network.

The example shown in FIG. 1 is a UPnP audio-visual (AV) system which is based on a UPnP device architecture. In the UPnP AV system, a control point (CP1) 101 and a control point (CP2) 102 perform discovery, description, control, and eventing operations according to the UPnP standard in order to control a media server 103 and a media renderer 104 which are controlled devices. Since the operations are described in the context of well-known UPnP standard, detailed description thereof is omitted.

In the UPnP AV system, the media server 103 and the media renderer 104 are controlled non-exclusively by both the control point (CP1) 101 and the control point (CP2) 102. Accordingly, as seen by either of the control points, the media server 103 or the media renderer 104 may change into an undesirable state.

FIGS. 2A and 2B are views for explaining a conventional system for exclusively controlling a controlled device. As an example of solving the aforementioned problem, the system shown in FIGS. 2A and 2B is disclosed in Korean Patent Publication Application No. 10-2004-55455.

As shown in FIG. 2A, in the conventional system, a look-up server is installed in a home gateway, and the look-up server manages a look-up table shown in FIG. 2B. The look-up table stores a list of controlled devices residing in the current network, control status of the controlled devices, and names of control points controlling the controlled devices.

When the control point CP1 controls the controlled devices residing in the current network, the look-up table shown in FIG. 2B is constructed. At this time, if the control point CP2 participates in the current network to control the devices, the home gateway transmits information on the control status of the associative devices to the control point CP2 with reference to the look-up table. Therefore, the control point CP2 is notified of the control status of the associated devices before the control point CP2 starts controlling the associated devices.

However, in the conventional system, a look-up server managing the look-up table must be separately installed. Accordingly, the look-up server may be a burden in the system. Even though the look-up server is installed, if another control point tries to forcibly control the controlled device without complying with the procedure discussed above, it is difficult to prevent such a control point from interfering with the controlled device. Therefore, there is a problem in that it is substantially impossible to prevent a plurality of control points from controlling the controlled device in an interfering manner.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above. An aspect of the present invention provides a method and apparatus for exclusively controlling a device in a home network by a control point acquiring an exclusive control authority without interference of other control points.

According to an aspect of an embodiment of the present invention, there is provided a method of a control point exclusively controlling one of the devices in a home network, which includes: (a) requesting an exclusive control authority to the device; (b) receiving a response message including an identifier used to successfully authenticate the exclusive control authority as a response to the request; and (c) controlling the device by using a control message including the identifier.

In the above aspect, the method may further include determining whether or not the device is currently exclusively controlled by an arbitrary control point, wherein (a) is performed only if the device is determined not to be exclusively controlled.

In addition, the identifier may be valid only during a predetermined time period, and information about the predetermined time may be included in the response message. In addition, the control point may request the device to update the effective time period for the identifier before the predetermined time elapses.

According to another aspect of an embodiment of the present invention, there is provided a computer readable recording medium having embodied thereon a computer program that when executed by a computer performs the method of exclusively controlling a device in a home network according to the aspects of embodiments of the present invention described above.

According to another aspect of an embodiment of the present invention, there is provided an apparatus for exclusively controlling a device in a home network, including: an exclusive control reservation unit which requests an exclusive control authority to the device; a receiving unit which receives a response message including an identifier used to successfully authenticate the exclusive control authority as a response to the request; and a control unit which controls the device by using a control message including the identifier.

In the above aspect, the apparatus may further include a determination unit which determines whether or not the device is currently exclusively controlled by an arbitrary control point, wherein the exclusive control reservation unit requests the exclusive control authority only if the device is determined not to be exclusively controlled.

According to another aspect of an embodiment of the present invention, there is provided a method of exclusively providing a service to one of a plurality of control points by one of the devices controlled by the control points in a home network, including: (a) receiving a request for an exclusive control authority over the device; (b) transmitting a response message including an identifier used to successfully authenticate the exclusive control authority and information on an effective time period of the identifier as a response to the request; and (c) selectively transmitting a response message to a control message according to whether or not the identifier is included in the control message validly.

In the above aspect, the method may further include notifying the home network that the device is disconnected from the home network during the effective time period of the identifier. In addition, the method may further include notifying the home network that the device is connected to the home network when the effective time period elapses without a request for updating the effective time period.

According to another aspect of an embodiment of the present invention, there is provided a computer readable recording medium having embodied thereon a computer program that when executed by a computer performs the method of exclusively providing a service to one of the plurality of control points by one of the devices controlled by the control points in a home network according to the above aspect of an embodiment of the present invention.

According to another aspect of an embodiment of the present invention, there is provided a device for exclusively providing a service to one of a plurality of control points controlling devices in a home network, including: a request receiving unit which receives a request for an exclusive control authority over the device; a request processing unit which transmits a response message including an identifier used to successfully authenticate the exclusive control authority and information about an effective time period of the identifier as a response to the request; and a response unit which selectively transmits a response message to a control message according to whether or not the identifier is included in the received control message validly.

In the above aspect, the device may further include a notification unit which notifies the home network that the device is disconnected from the home network during the effective time period of the identifier. In addition, the notification unit may notify the home network that the device is connected to the home network when the effective time period elapses without a request for updating the effective time period.

BRIEF DESCRIPTION OF THE DRAWINGS

The above and other features and advantages of embodiments of the present invention will become more apparent by describing in detail illustrative non-limiting embodiments thereof with reference to the attached drawings in which like reference numerals refer to like items.

FIG. 5 is a view showing a structure of an Alive message transmitted by a controlled device that is non-exclusively controlled;

FIG. 6 is a view showing a structure of an Alive message transmitted by a controlled device that is exclusively controlled;

FIGS. 7A and 7B are views showing a structure of an exclusive control reserve message and a response message thereto according to an embodiment of the present invention;

FIG. 8 is a view showing a structure of an exclusive control update request message according to an embodiment of the present invention;

FIGS. 9A and 9B are views showing a structure of an exclusive control release message and a response message thereto according to an embodiment of the present invention;

FIG. 10 is a view showing a structure of a control message according to an embodiment of the present invention.

DETAILED DESCRIPTION OF ILLUSTRATIVE, NON-LIMITING EMBODIMENTS OF THE INVENTION

Figure 1:
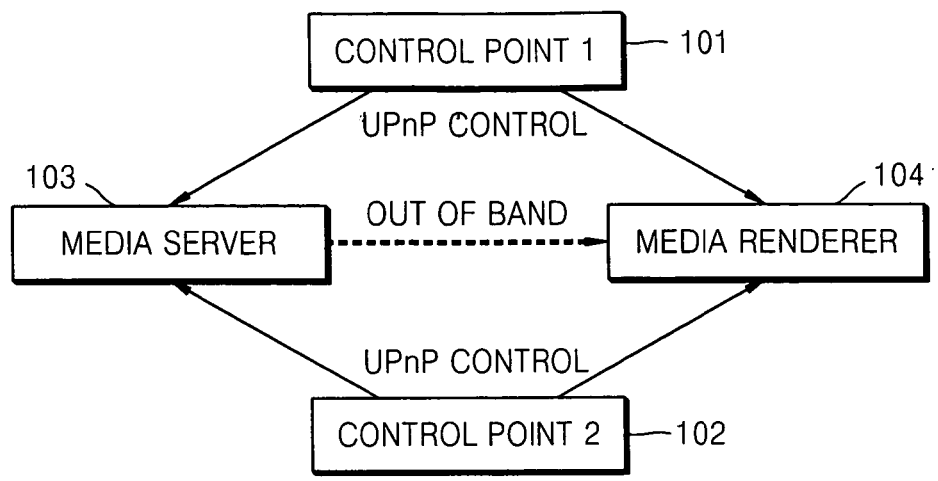
FIG. 1 is a view showing a construction of a general UPnP network.
Figure 2A:
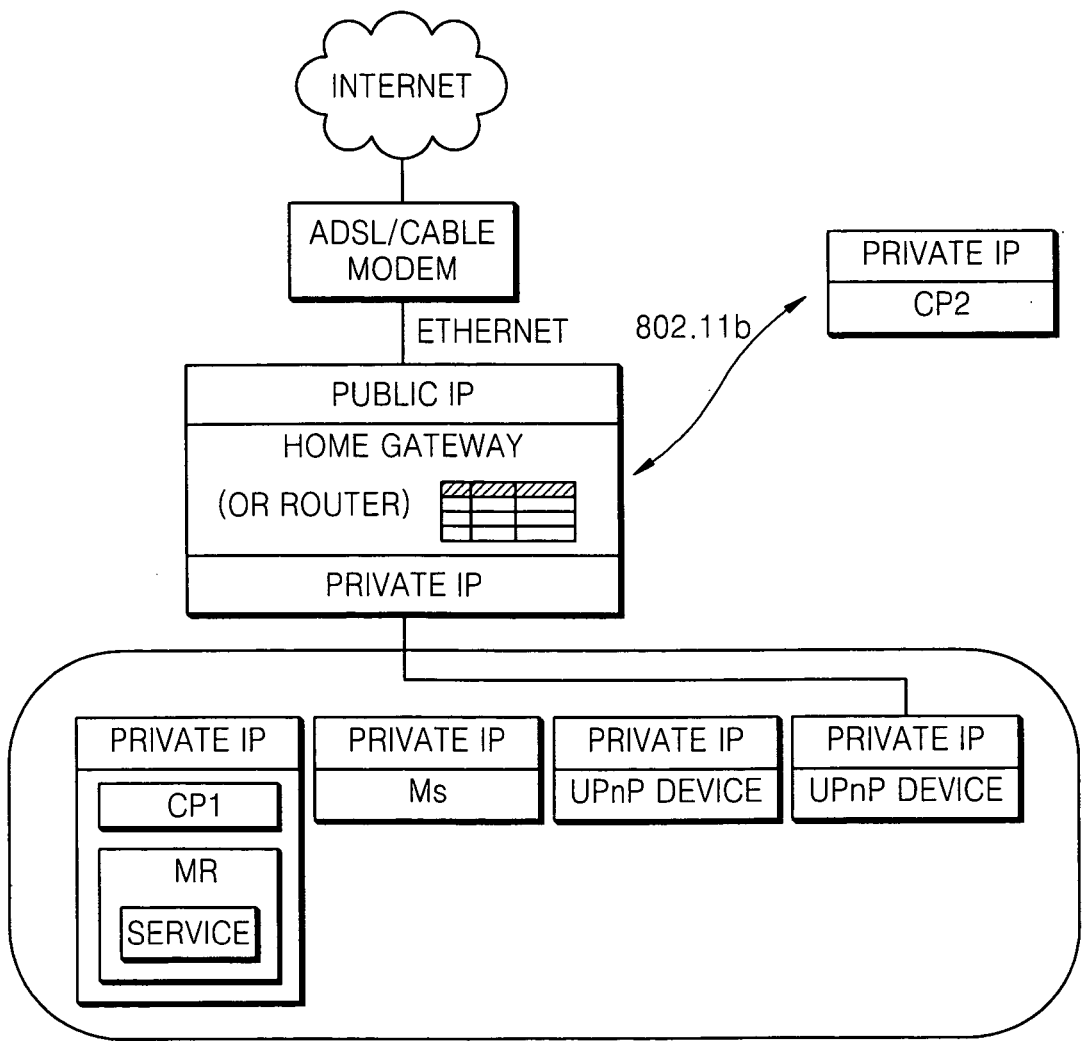
FIGS. 2A and 2B are views for explaining a conventional method of exclusively controlling a controlled device.
Figures 2B, 3:
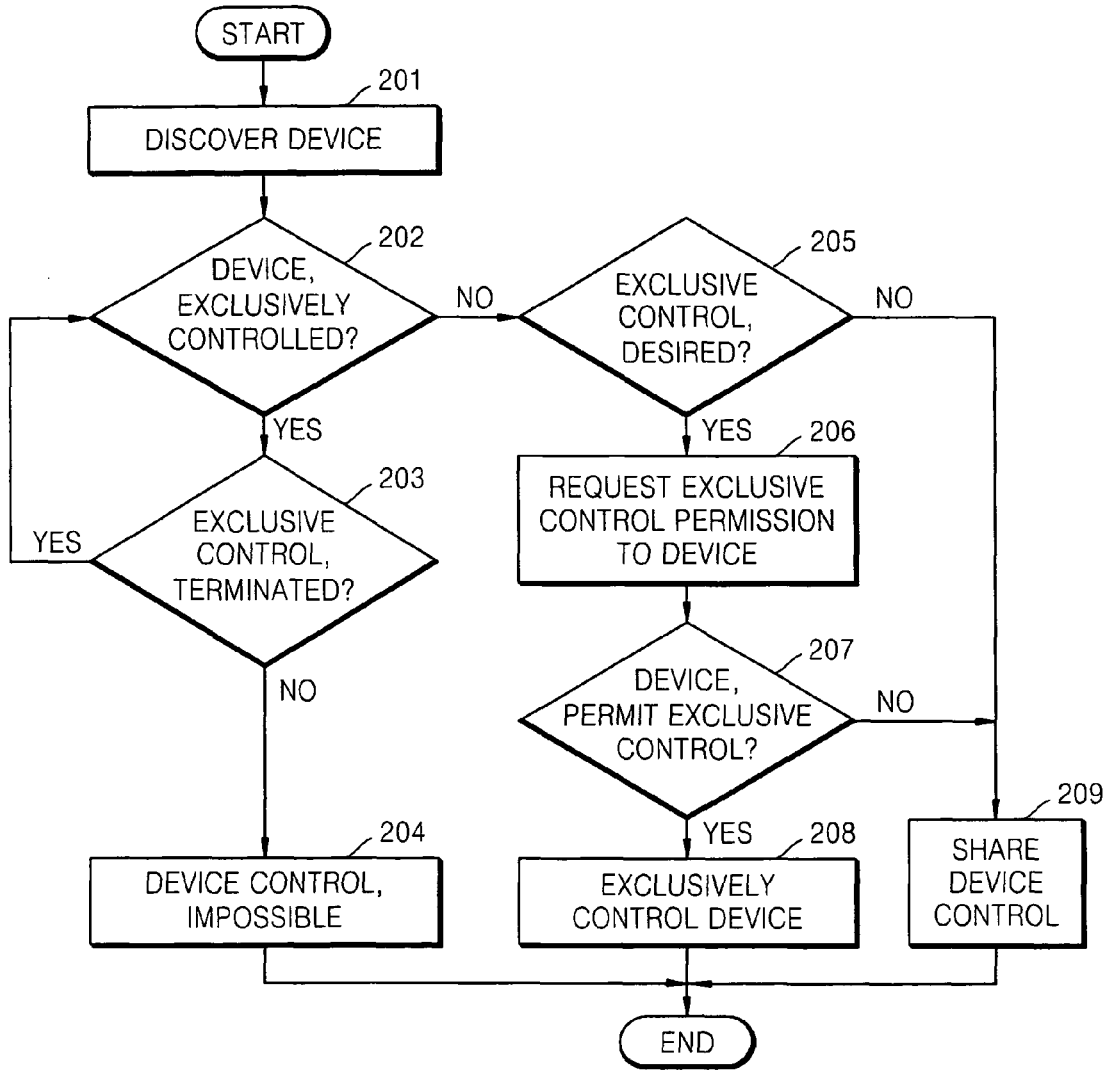
FIG. 3 is a flowchart showing a method of exclusively controlling a controlled device according to an embodiment of the present invention.

FIG. 3 is a flowchart showing a method of exclusively controlling a controlled device according to an embodiment of the present invention.

When a control point participates in a network, the control point receives an Alive message or an M-Search Response message and discovers the controlled device through a discovery procedure (201). According to the embodiment of the present invention, these messages include a header CONTROL-STATUS. The control point determines whether or not the controlled device is currently exclusively controlled with reference to the header (202). If a value of the header is MONOPOLY, the controlled device is determined to be exclusively controlled. If the value of the header is NOT-MONOPOLY, the controlled device is determined not to be exclusively controlled.

According to the embodiment, when the controlled device is determined to be exclusively controlled, it is determined whether or not the control point waits for an exclusive control time period by referencing a value of a header MONOPOLY-TIME included in the Alive message or the M-Search response message (203). According to the determination, after the exclusive control time period elapses, the control point again determines whether or not the controlled device is exclusively controlled, or the control point determines that the control point will not control the controlled device (204).

When the controlled device is determined not to be exclusively controlled, in operation 202, the control point determines whether or not the control point should control the controlled device (205). If it is necessary to control the controlled device, a general control operation is performed (209). When the control point desires to control the control device, the control point sends an exclusive control reserve message to the controlled device to request permission for exclusive control (206). These are new messages, described here, which include a header VISION including information about whether or not other control points are permitted to discover the controlled device and a header TIMEOUT including information on a desired exclusive control time period.

When exclusive control is permitted (207), the controlled device receiving the exclusive control reserve message transmits a reserve response message, which is a new message described here. If the exclusive control is not permitted, the controlled device transmits an error message. Similar to the exclusive control reserve message, the reserve response message includes a header VISION, a header TIMEOUT, and a header RID including an RID, that is, information for authenticating an exclusive control authority. The control point that receives the reserve response message can exclusively control the controlled device by using the RID (208). Structures of these messages will be described later in detail.

Figure 4:
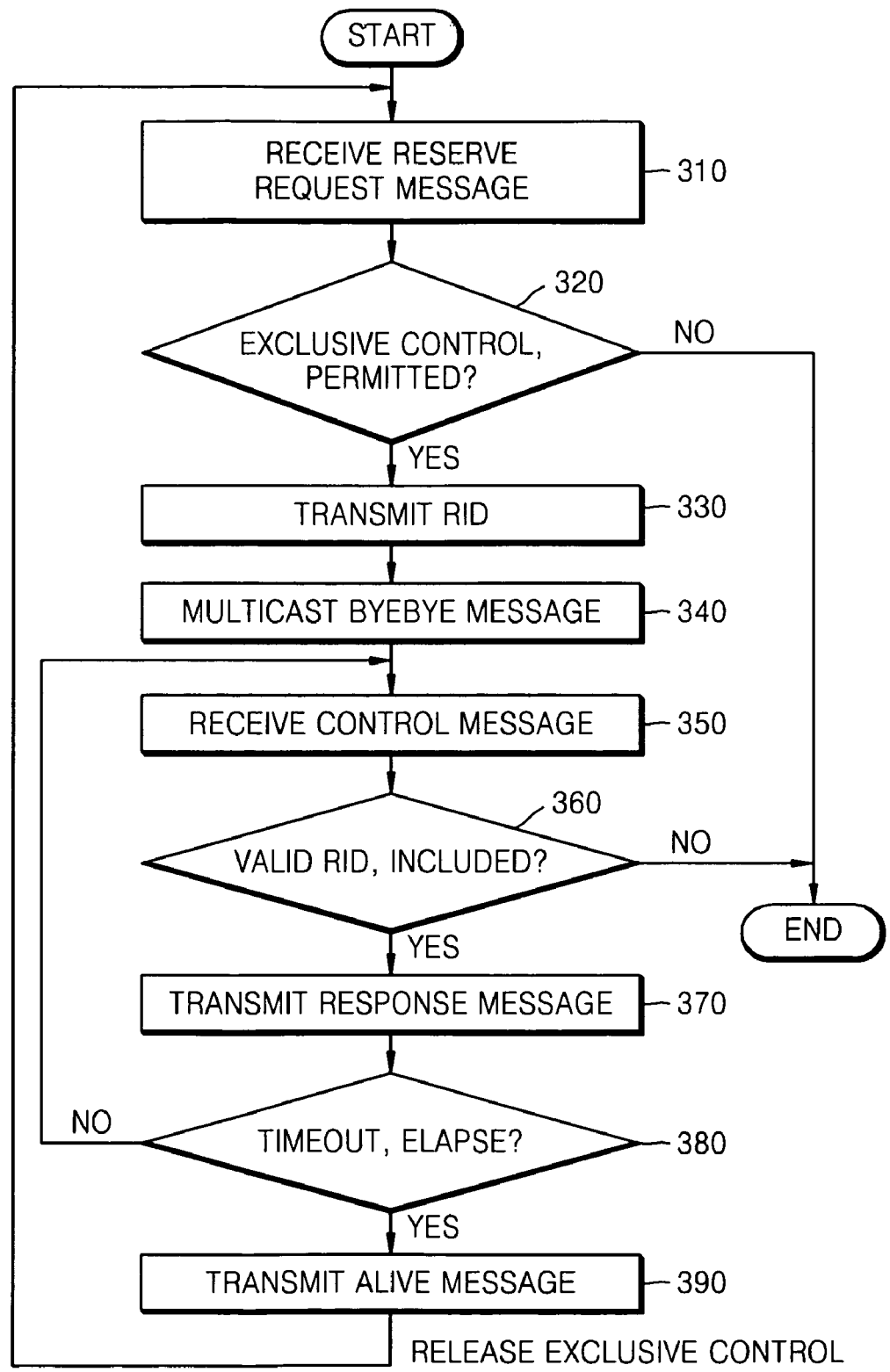
FIG. 4 is a flowchart showing a method of allowing a controlled device to exclusively provide a service to a control point according to an embodiment of the present invention.

FIG. 4 is a flowchart showing a method of allowing a controlled device to exclusively provide a service to a control point according to an embodiment of the present invention.

According to the embodiment, the controlled device, that is, a home network device, receives from the control point an exclusive control reserve message for requesting the exclusive control (310). The controlled device determines whether or not to permit the control point to exclusively control the controlled device (320). If exclusive control is permitted, the controlled device transmits a reserve response message including the RID to the control point (330). The reserve response message includes a header TIMEOUT including information on an effective time period for the RID. The controlled device multicasts a well-known message ByeBye over the network, so that other control points cannot discover the controlled device during the exclusive control time period (340). At this time, although not shown in the figure, it is preferable that the Alive message and the M-Search response message are not transmitted during the exclusive control time period.

After that, when a control message INVOKE is received (350), it is determined whether or not the control message INVOKE includes a valid RID, that is, an RID that matches with the RID transmitted in operation 330 and is valid (360).

When the received control message INVOKE includes the valid RID, a control response message for the control message INVOKE is transmitted (370).

Next, it is determined whether or not the effective time period for the RID transmitted in operation 330 expires (380). If the effective time period expires, an Alive message is transmitted over the network, or the M-Search message is sent in response so as to provide notification that the exclusive control is released (390).

FIG. 5 is a view showing a structure of an Alive message transmitted by a controlled device that is non-exclusively controlled. FIG. 6 is a view showing a structure of an Alive message transmitted by a controlled device that is exclusively controlled.

According to this embodiment of the present invention, the Alive message includes header CONTROL-STATUS in addition to headers of the Alive message defined in the UPnP standard. The header CONTROL-STATUS represents a control status of the controlled device. The header CONTROL-STATUS may have header values NOT-MONOPOLY and MONOPOLY. The header value NOT-MONOPOLY indicates that there is no control point exclusively controlling the controlled device. The header value MONOPOLY indicates that the controlled device is exclusively controlled.

The exclusively controlled device writes a user-friendly name of the control point in the header CONTROL-STATUS of the Alive message (e.g., "Control Point 1"), so that the controlled device can notify a user that the controlled device is exclusively controlled. In addition, the Alive message transmitted by the exclusively controlled device further includes the header MONOPOLY-TIME indicating the remaining amount time in the exclusive control time period.

Although not shown in the figure, the M-Search response message also can include headers CONTROL-STATUS and MONOPOLY-TIME, similar to the Alive message described above.

FIGS. 7A and 7B are views showing a structure of an exclusive control reserve message and a response message thereto according to an embodiment of the present invention.

The exclusive control reserve message shown in FIG. 7A is a new message described here. The exclusive control reserve message is a message from the control point for requesting the controlled device to permit the control point to exclusively control the controlled device. In the figure, RESERVE*HTTP/1.1 is a request line indicating that a message is the exclusive control request message. RESERVE in the RESERVE*HTTP/1.1 is a new HTTP method described here. A header HOST specifies a domain name, an IP address, or a port number of the controlled device. A header VISION indicates whether or not a controlled device that is exclusively controlled by a control point is permitted to be discovered by other control points. The header VISION may have header values NOT-VISIBLE and VISIBLE. In the case of the header value NOT-VISIBLE, the exclusively controlled device multicasts a message ByeBye over the network, so that other control points cannot transmit the Alive message and the M-Search response message during a time period TIMEOUT described later.

A header TIMEOUT includes information about an effective time period for the exclusive control. Namely, the control point can write in the header TIMEOUT a time period that the control point desires to exclusively control the controlled device.

The message shown in FIG. 7B is a new response message described here, sent in response to the exclusive control reserve message from the control point.

In the figure, HTTP/1.1 200 OK is a response line indicating that the message is the exclusive control permission message for permitting the control point to exclusively control the controlled device. HTTP/1.1 denotes a HTTP version of the controlled device, and 200 OK denotes an HTTP success code. When the control point is not permitted to exclusively control the controlled device, other error messages are transmitted.

A header VISION shown in FIG. 7B is equal to that of FIG. 7A, and thus, detailed description is omitted. However, the header values of the header VISION included in the response message may be different from those in the exclusive control reserve message. For example, although the control point submits a request with a header value NOT-VISIBLE, the controlled device may permit exclusive control and allocate a header value VISIBLE.

The header TIMEOUT indicates an exclusive control time period that the control point can exclusively control the controlled device. In the present embodiment the TIMEOUT value is in units of seconds. When the exclusive control time period elapses, the control point loses the exclusive control authority. If the control point desires to continuously control the controlled device, the control point must transmit an exclusive control update request message before the exclusive control time period elapses. Similar to the header value VISION, the header values of the header TIMEOUT included in the response message may be different from those in the header TIMEOUT included in the exclusive control reserve message.

The header RID represents an identifier RID which the controlled device allocates to the control point so as to permit the control point to exclusively control the controlled device. The identifier RID may include a reservation ID in a form of "uuid:"+UUID. The control point controlling the controlled device may successfully acquire an exclusive control authority by using the identifier RID.

FIG. 8 is a view showing a structure of an exclusive control update request message according to an embodiment of the present invention.

As described above, when the exclusive control time period TIMEOUT included in the exclusive control response message elapses, the control point loses the exclusive control authority. Therefore, a control point that desires to continuously control the controlled device must transmit an exclusive control update request message shown in FIG. 8 before the exclusive control time period elapses.

The exclusive control update request message has the same request line as the exclusive control request message. In addition, the exclusive control update request message is almost the same as the exclusive control reserve message shown in FIG. 7A. However, the exclusive control update request message includes a header RID instead of the header VISION of the exclusive control reserve message. The controlled device receiving the exclusive control update request message can distinguish a new exclusive control reserve message from the exclusive control update request message according to the presence of the header RID.

FIGS. 9A and 9B are views showing a structure of an exclusive control release message and a response message thereto according to an embodiment of the present invention.

The exclusive control release message and the response message thereto are new messages described here. These messages are messages from the control point that request the controlled device to terminate exclusive control.

As shown in FIGS. 9A and 9B, the exclusive control release message includes UNRESERVE*HTTP/1.1, that is, a request line indicating that a message is the exclusive control release message, a header HOST, and a header RID. The header values HOST and RID are the same as described above. The response message to the exclusive control release message includes HTTP/1.1 200 OK, that is, a response line indicating that the exclusive control ends normally.

FIG. 10 is a view showing a structure of a control message according to an embodiment of the present invention. As shown in FIG. 10, the control message further includes the header RID in addition to headers of the conventional control message defined in the conventional UPnP standard. The controlled device receiving the control message, shown in FIG. 10, can perform an authorization process by using the header RID to determine whether or not the control point transmitting the control message has exclusive control authority.

Figure 11:
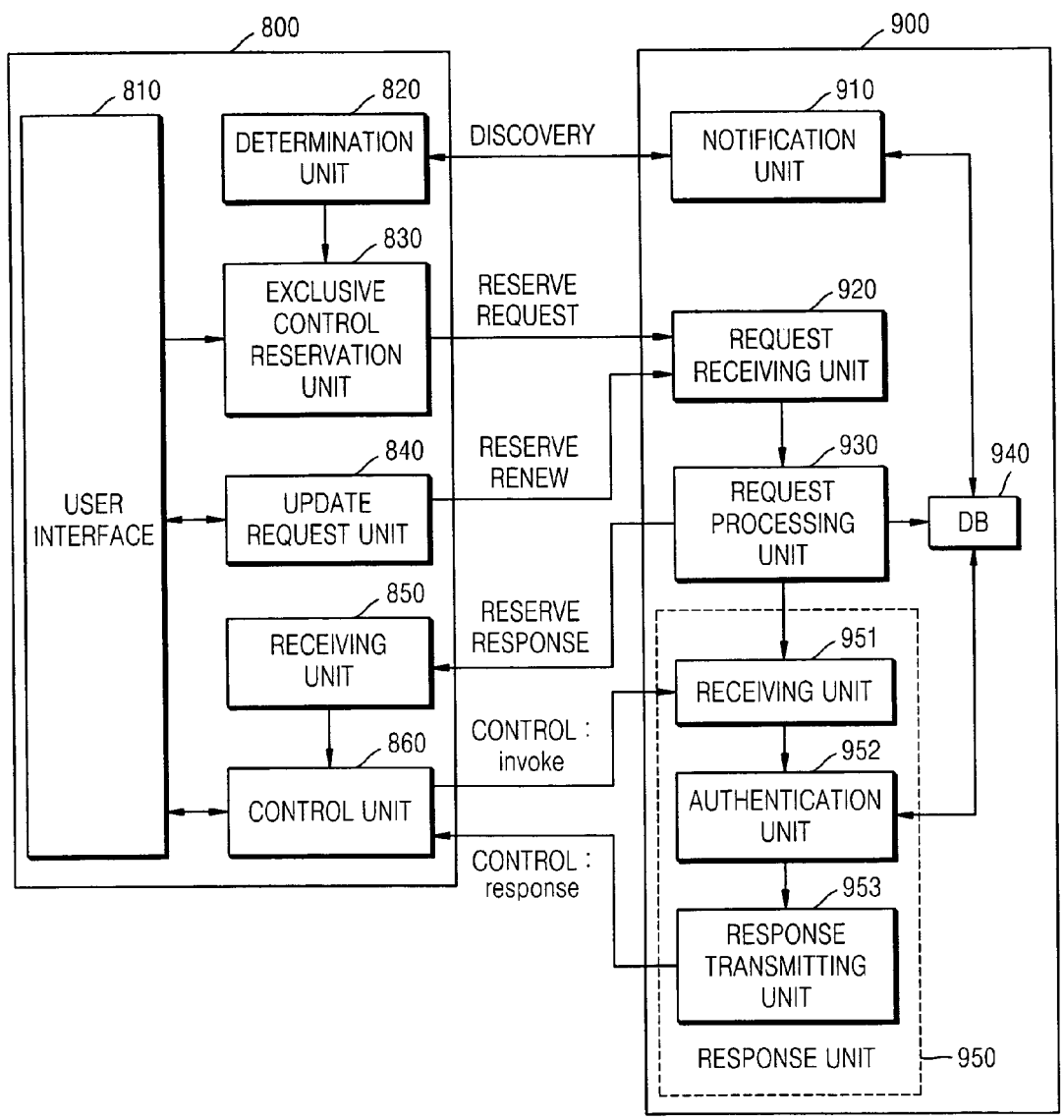
FIG. 11 is a view showing constructions of a control point and a controlled device according to an embodiment of the present invention.

FIG. 11 is a view showing construction of a control point and a controlled device according to an embodiment of the present invention.

As shown in FIG. 11, the control point 800 according to an embodiment of the present invention includes a user interface 810, a determination unit 820, an exclusive control reservation unit 830, an update request unit 840, a receiving unit 850, and a control unit 860.

The user interface 810 is a tool through which the control point 800 receives an input from a user or transmits information to the user.

The determination unit 820 performs a discovery procedure defined in the UPnP standard by exchanging messages with a controlled device 900 which is to be controlled by the control point 800. More specifically, according to this embodiment of the present invention, the determination unit 820 receives an Alive message or an M-Search Response message from the controlled device 900 and determines whether or not the controlled device 900 is currently exclusively controlled by referencing the header CONTROL-STATUS of the messages. If the controlled device 900 is currently exclusively controlled, the determination unit 820 determines whether or not the control point 800 exclusively controls the controlled device 900 by taking into consideration the remaining exclusive control time period.

According to the result determined by the determination unit 820, the exclusive control reservation unit 830 transmits an exclusive control reserve message to the controlled device 900 that is not exclusively controlled by other control points. The receiving unit 850 receives a response message in response to the exclusive control reserve message. As described above, the response message includes the identifier RID for successfully authenticating the exclusive control authority.

The control unit 860 performs a control procedure defined in the UPnP standard. The control unit 860 of the control point 800 transmits a control message including the RID so as to authenticate that the control point 800 has the exclusive control authority over the controlled device 900.

Before the exclusive control time period corresponding to the header value TIMEOUT of the response message to the exclusive control reserve message elapse, the update request unit 840 transmits an exclusive control update request message to the controlled device 900 so as to extend the exclusive control time period.

On the other hand, the controlled device 900, that is, a home network device according to an embodiment of the present invention, includes a notification unit 910, a request receiving unit 920, a request processing unit 930, a database 940, and a response unit 950. The response unit 950 includes a receiving unit 951, an authentication unit 952, and a response transmitting unit 953.

The notification unit 910 transmits an Alive message or an M-Search Response message to the control point 800 to send notification of a control status as to whether or not the controlled device 900 is currently exclusively controlled. In addition, when the header VISION of the response message, sent in response to the exclusive control reserve message, has a header value NOT-VISIBLE, the notification unit 910 transmits a message ByeBye over the network and does not transmits the Alive message and the M-Search response message during the time corresponding to the value of the header TIMEOUT in the response message so that the controlled device 900 will not be discovered in the network.

In addition, when the time corresponding to the value of the header TIMEOUT in the response message elapses without receiving an exclusive control update request, the notification unit 910 of the control point 800 can use the Alive message or the M-Search response message to provide notification that the controlled device 900 is connected to the network. In this case, the values of the headers CONTROL-STATUS of the Alive message and the M-Search response message are NOT-MONOPOLY.

The request receiving unit 920 receives the exclusive control reserve message or the exclusive control update request message from a control point 800. The request processing unit 930 transmits a response message in response to receiving the exclusive control reserve message received through the request receiving unit 920. As described above, the response message includes headers RID and TIMEOUT. The values of the headers are stored in the database 940.

The receiving unit 951 receives a control message from the control point 800. The authentication unit 952 determines whether or not the received control message includes a valid RID. More specifically, the authentication unit 952 authenticates the validity of the RID by determining, with reference to the database 940, whether or not the received RID matches the RID allocated by the request processing unit 930 and whether or not the effective time period has expired.

According to the result of the authentication by the authentication unit 952, the response transmitting unit 953 transmits the response message only if the received control message includes a valid RID. If the received control message does not include a valid RID, the response transmitting unit 953 transmits an error message to the control point 800.

Embodiments of the present invention can be written as computer programs and can be implemented in general-use digital computers that execute the programs using a computer readable recording medium.

Examples of the computer readable recording medium include storage media which include magnetic storage media e.g., ROM, floppy disks, hard disks, etc., and optical recording media e.g., CD-ROMs, or DVDs. The computer readable recording medium can also include transmission media such as carrier waves e.g., transmission through the Internet.

According to the present invention, a control point acquires exclusive control authority over a controlled device so that it is possible to prevent other control units from interfering with the controlled device so as not to perform an operation which the control point does not desire. In addition, since the controlled device determines whether to permit the control point to control the controlled device, the present invention can be adaptively employed according to characteristics of the control device. In addition, the present invention can be employed irrespective of a topology of a network, for example, a network having no home gateway or a network having several home gateways. In addition, since an exclusive control authority of the control point is authenticated by using an identifier RID, it is possible to exclusively control the controlled device irrespective of interference by other control points.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of a control point, among a plurality of control points, exclusively controlling a controlled device in a home network based on a universal plug and play (UPnP) standard, comprising:
   (a) determining, with reference to information included in a message transmitted from the controlled device to the control point through a discovery procedure of the UPnP standard, whether the controlled device is exclusively under control of another control point of the plurality of control points, the information indicating whether the controlled device is exclusively controlled by another control point of the plurality of control points;
   (b) if the controlled device is determined to be exclusively controlled, re-determining whether the controlled device is exclusively controlled by another control point of the plurality of control points after an exclusive control time period of the another control point;
   (c) transmitting an exclusive control reserve message for requesting an exclusive control authority to control the controlled device only if the controlled device is determined not to be exclusively controlled, wherein the exclusive control reserve message includes information about whether or not control points of the plurality of control points other than the one control point are permitted to discover the controlled device;
   (d) receiving, in response to the exclusive control reserve message, a response message including an identifier for authenticating the exclusive control authority; and
   (e) controlling the controlled device by using a control message containing the identifier included in the response message.

2. The method of claim 1,
   wherein the determination is performed with reference to a header of an Alive message or M-Search Response message transmitted by the controlled device, and
   wherein the header includes the information about whether the controlled device is exclusively controlled.

3. The method of claim 1, wherein the identifier is valid during only a predetermined time period, and information about the predetermined time is included in the response message.

4. The method of claim 3, further comprising requesting the controlled device to update the predetermined time period of the identifier before the predetermined time elapses.

5. The method of claim 1,
   wherein in (e) an Invoke message having a header including the identifier is transmitted to the controlled device.

6. A non-transitory computer readable storage medium having embodied thereon a computer program that when executed by a computer performs the method of claim 1.

7. An apparatus for exclusively controlling a controlled device in a home network based on a universal plug and play (UPnP) standard, the apparatus being one control point of a plurality of control points, comprising:
   a computer processor;
   a determination unit, under control of the processor, which determines, with reference to information included in a message transmitted from the controlled device through a discovery procedure of the UPnP standard, whether the controlled device is under exclusive control of another control point of said plurality of control points, the information indicating whether the controlled device is exclusively controlled by another control point of the plurality of control points;
   an exclusive control reservation unit which transmits an exclusive control reserve message for requesting exclusive control authority to the controlled device only if the controlled device is determined not to be exclusively controlled, wherein the exclusive control reserve message includes information about whether or not control points of the plurality of control points other than the one control point are permitted to discover the controlled device;
   a receiving unit which receives, in response to the exclusive control reserve message, a response message including an identifier for authenticating the exclusive control authority; and
   a control unit which controls the controlled device by using a control message including the identifier,
   wherein the determination unit, if the controlled device is determined to be exclusively controlled, re-determines whether the controlled device is exclusively controlled by another control point of the plurality of control points after an exclusive control time period of the another control point.

8. The apparatus of claim 7,
   wherein the determination unit determines whether the controlled device is exclusively controlled with reference to a header of an Alive message or M-Search Response message transmitted by the controlled device, and wherein the header includes the information about whether the controlled device is exclusively controlled.

9. The apparatus of claim 7, wherein the identifier is valid during only a predetermined time period, and information about the predetermined time is included in the response message.

10. The apparatus of claim 9, further comprising an update request unit which requests the controlled device to update the predetermined time period of the identifier before the predetermined time elapses.

11. The apparatus of claim 7, wherein the control unit transmits an Invoke message having a header including the identifier to the controlled device.

12. A method of exclusively providing a service to one control point of a plurality of control points by a controlled device controlled by the control points in a home network based on a universal plug and play (UPnP) standard, comprising:

(a) notifying, through a discovery procedure of the UPnP standard, the one control point of the plurality of control points of a message including a control status as to whether the controlled device is currently exclusively controlled by another control point of the plurality of control points, wherein the message includes an exclusive control time period of the another control point if the controlled device is exclusively controlled by the another control point;

(b) receiving an exclusive control reserve message for requesting an exclusive control authority over the controlled device from the one control point of the plurality of control points only if the exclusive control time period of the another control point has elapsed, wherein the exclusive control reserve message includes information about whether or not control points of the plurality of control points other than the one control point are permitted to discover the controlled device;

(c) transmitting, in response to receiving exclusive control reserve message, a response message including an identifier for authenticating exclusive control authority and information about an effective time period for the identifier; and (d) selectively transmitting a response message in response to a control message according to whether the identifier is included in the control message and is valid.

13. The method of claim 12, further comprising (e) notifying the home network that the controlled device is disconnected from the home network during the effective time period of the identifier.

14. The method of claim 13, further comprising (f) notifying the home network that the controlled device is connected to the home network when the effective time period elapses if a request for updating the effective time period is not received during the effective time period.

15. The method of claim 14, wherein, in (f), an Alive message or an M-Search Response message is transmitted according to the UPnP standard.

16. The method of claim 13, wherein, in (e), a ByeBye message is multicast over the home network, and an M-Search Response message and an Alive message are prevented from being transmitted during the effective time period.

17. The method of claim 12, wherein (d) comprises:
(d1) receiving the control message;
(d2) determining whether the identifier is included in a header of the control message and whether the effective time period of the identifier has elapsed; and
(d3) transmitting the response message in response to the control message, if the identifier is determined to be included in the header and if the effective time period of the identifier is determined not to have elapsed.

18. A non-transitory computer readable storage medium having embodied thereon a computer program that when executed by a computer performs the method of claim 12.

19. A device for exclusively providing a service to one control point of a plurality of control points controlling the device in a home network based on a universal plug and play (UPnP) standard, comprising:
a computer processor;
a notification unit, under control of the processor, which notifies, through a discovery procedure of the UPnP standard, the one control point of the plurality of control points of a message including a control status as to whether the device is currently exclusively controlled by another control point of the plurality of control points, wherein the message includes an exclusive control time period of the another control point if the device is exclusively controlled by the another control point;
a request receiving unit which receives an exclusive control reserve message for reserving exclusive control authority over the device from the one control point of the plurality of control points only if the exclusive control time period of the another control point has elapsed, wherein the exclusive control reserve message includes information about whether or not control points of the plurality of control points other than the one control point are permitted to discover the controlled device;
a request processing unit which, in response to receiving the exclusive control reserve message for reserving exclusive control authority, transmits a reserve response message including an identifier for authenticating the exclusive control authority and information about an effective time period for the identifier; and
a response unit which selectively transmits a control response message in response to receiving a control message according to whether the identifier is included in the received control message and is valid.

20. The device of claim 19, further comprising the notification unit which notifies the home network that the device is disconnected from the home network during the effective time period of the identifier.

21. The device of claim 20, wherein the notification unit notifies the home network that the device is connected to the home network when the effective time period elapses without receipt of a request for updating the effective time period.

22. The device of claim 21, wherein the notification unit transmits an Alive message or an M-Search Response message according to the UPnP Standard.

23. The device of claim 20, wherein the notification unit multicasts a ByeBye message over the home network and does not transmits an Alive message and an M-Search Response message during the effective time period.

24. The device of claim 19, wherein the response unit comprises:
a receiving unit which receives the control message;
an authentication unit which authenticates the validity of the identifier by determining whether or not the identifier is included in a header of the control message and whether or not the effective time period of the identifier has elapsed; and a response transmitting unit which transmits the control response message in response to receiving the control message, if the identifier is determined to be included in the header and if the effective time period of the identifier is determined not to have elapsed.

* * * * *